(12) United States Patent
Hayden

(10) Patent No.: US 6,593,271 B1
(45) Date of Patent: Jul. 15, 2003

(54) CARBON CHAR FOR METALS-REMOVAL

(75) Inventor: Richard A. Hayden, Pittsburgh, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 0 days.

(21) Appl. No.: 09/335,108

(22) Filed: Jun. 17, 1999

(51) Int. Cl.$^7$ ............................................... C01B 31/00
(52) U.S. Cl. .................................. 502/416; 423/445 R
(58) Field of Search ....................... 423/445 R; 502/416

(56) References Cited

U.S. PATENT DOCUMENTS

| | | | |
|---|---|---|---|
| 4,048,061 A | 9/1977 | Blytas | 208/251 R |
| 4,070,282 A | 1/1978 | Otto | 210/27 |
| 4,741,831 A | 5/1988 | Grinstead | 210/638 |
| 4,985,150 A | 1/1991 | Cronje et al. | 210/661 |
| 5,082,568 A | 1/1992 | Holler | 210/679 |
| 5,324,703 A * | 6/1994 | McCue et al. | 502/424 |
| 5,538,929 A * | 7/1996 | Sudhakar et al. | 502/180 |

FOREIGN PATENT DOCUMENTS

| | | |
|---|---|---|
| DE | 3731920 A | 4/1989 |
| EP | 0000214 A | 1/1979 |
| EP | 0545503 A | 6/1993 |
| FR | 2221404 A | 10/1974 |
| GB | 1445754 A | 8/1976 |
| WO | WO8903434 A | 4/1989 |

OTHER PUBLICATIONS

Mattson et al. *Activated Carbon—Surface chemistry and Adsorption from Solution* pp. 30, 134–138 Morel Deckker Inc, NY 1971.*
Corapcioglu et al. 'The Surface Acidity And Characterization Of Some Commercial Activated Carbons' in *Carbon* vol. 25 #4 pp. 569–578, 1987.*
"Activated Carbon Surface Modifications by Nitric Acid, Hydrogen Peroxide and Ammonium Peroxydisulfate Treatments"; C. Moreno–Castillo, M. A. Ferro–Garcia, J. P. Joly, I. Bautista–Toledo, F. Carrasco–Marin and J. Rivera–Utrilla; Langmuir 1995, pp. 4386–4392.
"Study of the Oxidation of Activated Carbons by Ammonium Peroxydisulphate"; A. Mueden, F. Carrasco–Marin and C. Moreno–Castilla; The European Carbon Conference "Carbon96" pp. 610–611; 1996.
"Removing Lead in Drinking Water with Activated Carbon"; Roy M. Taylor and Roy W. Kuennen; Enviromental Progress vol. 13, No. 1, pp. 65–70.
"Chemical Interactions Between Inorganics and Activated Carbon"; C. P. Huang; Department of Civil Engineering, University of Delaware, Chapter 8, pp. 281–339.
"Adsorption of Copper from Aqueous Solutions by Activated Carbons"; Diksha, Meenakshi Goyal, V. K. Rattan and R.C. Bansal; Recent Trends in Carbon pp. 237–243; Department of Chemistry, Indian Institute of Technology, Hauz Khas, New Delhi 110016, India.
Article "The Creation of Acid Carbon Surfaces By Treatment with (NH) S O", C. Moreno–Castilla, F. Carrasco–Marin and A. Mueden; Carbon vol. 35, No. 10–11, pp. 1619–1626, 1997; Elsevier Science Ltd.
Article "Influence of the Oxygen Surface Complexes of Activated Carbons on the Adsorption of Chromium Ions from Aqueous Solutions: Effect of Chloride and Humic Acid"; I. Bautista–Toledo, J. Rivera–Utrilla, M. A. Ferro–Garcia and C. Moreno–Castilla; Carbon vol. 32, No. 1, pp. 93–100, 1994; Elsevier Science Ltd.
Article "Adsorption of the Ions of Zinc, Cadmium, Copper and Lead on Oxidized Anthracite"; N. Petrov, T. Budinova and I. Khavesov; Carbon vol. 30, No. 2, pp. 135–139, 1992.
Article "Activated Carbon Surface modifications by Nitric Acid, Hydrogen Peroxide and Ammonium Peroxydisulfate Treatments"; C. Moreno–Castilla, M. A. Ferro–Garcia, J. P. Joly, I. Bautista–Toledo, F. Carrasco–Marin and J. River-a–Ultrilla; Langmuir vol. 11, pp. 4386–4392, 1995.
Database WPI Section Ch. Week 197717 Derwent Publications Ltd., London, GB; Class D15, AN 1977–29834Y, XP002151015 & JP 52033891 A (Tokyo Kagaku Sochi) Mar. 15, 1977 abstract.

* cited by examiner

*Primary Examiner*—Stuart L. Hendrickson
(74) *Attorney, Agent, or Firm*—Cohen & Grigsby, P.C.

(57) ABSTRACT

A carbonaceous char is disclosed for the removal of metals from aqueous and other non-organic media. Carbonaceous chars having a normalized contact pH of less than 3 and preferably less than or equal to 2.5 provide enhanced metal removal from such media.

3 Claims, 3 Drawing Sheets

Lead Residuals as a Function of Contact pH

Lead Residuals as a Function of Contact pH

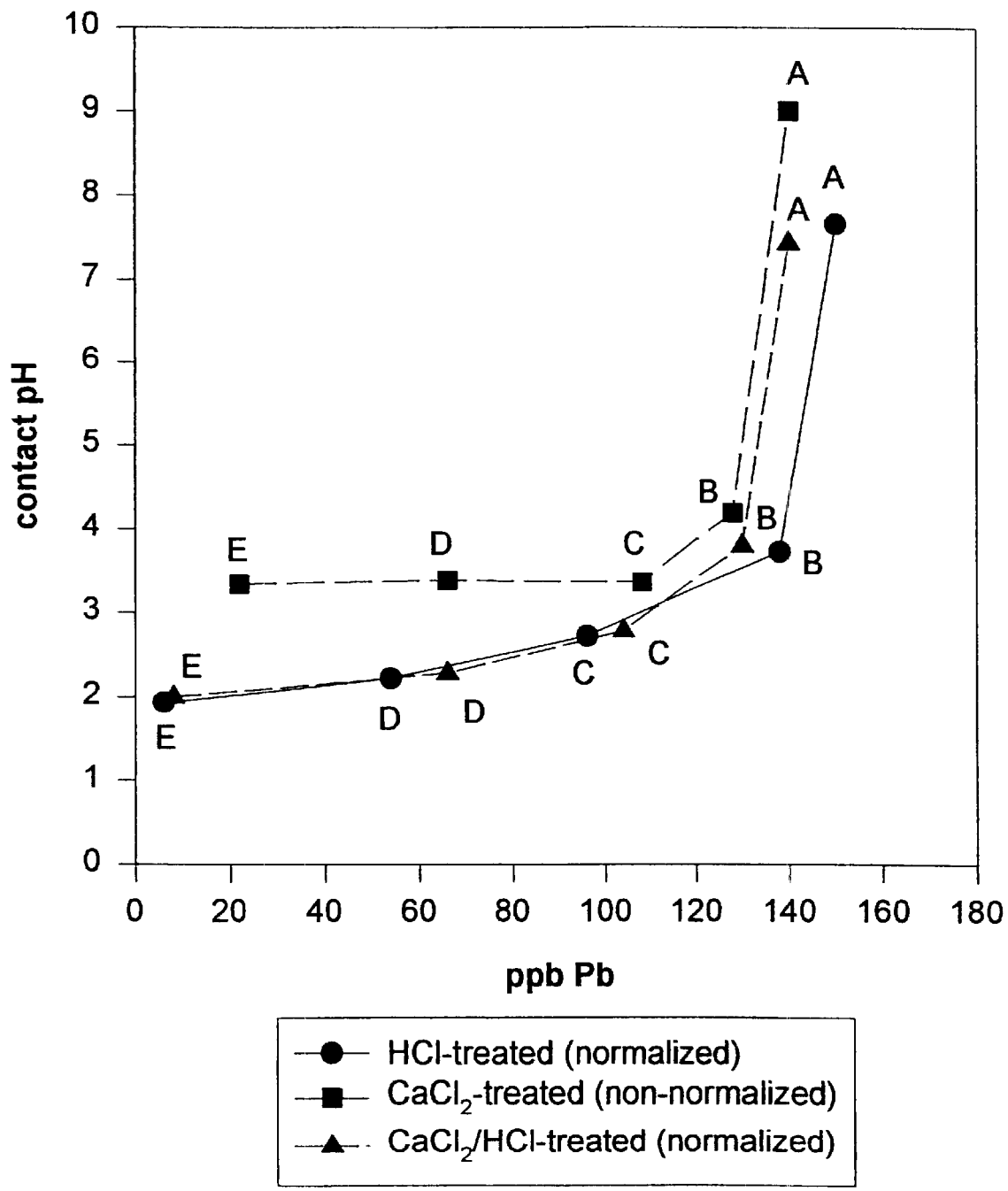

CARBON CHAR FOR METALS-REMOVAL

FIELD OF THE INVENTION

The present invention relates to a carbonaceous char which has utility for the removal of cationic metals from aqueous and other non-organic media.

BACKGROUND OF THE INVENTION

This invention relates to a carbonaceous char for the purification of aqueous and other non-organic media. The purification is accomplished by using a char of the present invention to remove metals which contaminate the media. Typical metals include mercury, lead, copper, manganese, nickel, and cobalt, which exist in such media primarily as bivalent metal ions. Even at very low concentrations many of these metals are toxic to life and require removal prior to use in potable water systems. Carbonaceous chars, such as activated carbons and charcoals, have been used extensively for the removal of toxic organic compounds from such aqueous streams, but have been found to have only limited utility for the removal of metals.

To improve the metals-removal capabilities of a char, a number of methods have been employed in the prior art. For example, organic chelants such as ethylenediamine tetraacetic acid (EDTA) and nitrilotriacetic acid (NTA) are used to bind the metal to the carbon. These chelants may be physically adsorbed onto the carbon initially or added to the aqueous solution prior to contacting the solution with the char. The disadvantages to this approach include the high costs of the chelants and their relative instability on the carbon surface.

In other methods, the carbon surface itself is treated to enhance the metals-removal properties of the carbon surface. For example, it well known in the prior art that oxidation of the carbon surface is capable of improving the metals-removal ability of a carbon material. Other modifications of the carbon surface have included treatments with sulfur compounds or the direct chemical attachment to the carbon surface of functional groups which are thought to have metals-removal properties. Depending on the type of surface modification attempted, the mechanism of metals removal may vary. In some cases, an ionic exchange mechanism is believed to characterize the process, while in other cases the mechanism appears to be one which is more covalent and chelating in nature. In many other cases, the exact mechanism of metals removal is unknown and the subject of competing theories.

In all of the prior art, few useful guidelines have been established by which the intrinsic properties of a carbon char can be used to establish the effectiveness of a given char for metals removal. In most cases, the carbon material is tested directly for the removal of the cation of interest. Although the oxygen content of the char has been cited by some as a compositional parameter important to metals removal, it has been shown that not all oxygen bound to the carbon surface is active for metals removal. Some functional groups such as ether, lactone, and carbonyl, have little relevance in and of themselves to metals removal. Similarly, titration values for surface acidity have been suggested as an indicator, but not all measured surface acidity may be useful for metals removal. In some treated carbon chars, the majority of the measured acidity may be present merely as free acid and serve no useful purpose.

Therefore, it is the object of the present invention to provide a carbonaceous char for the removal of metals from aqueous and other non-organic media which is intrinsically active and highly effective for metals removal. It is further the object of the present invention to identify and measure that property of the char which can be most effectively related to metals removal in this application.

SUMMARY OF THE INVENTION

The present invention provides for a carbonaceous char for the removal of metals from aqueous and other non-organic media. Chars effective for this purpose have a normalized contact pH less than 3 and preferably equal to or less than 2.5. The utility of the char for this application has been found to correlate with a normalized contact pH of the char. At normalized contact pH values above about 4, even a large decrease in pH often provides only a marginal improvement in the metals-removal capability of the char. However, below a normalized contact pH of around 2.5, the metals-removal capabilities of the char can improve dramatically with even a small additional decrease in pH.

For the purpose of the present invention the term "normalized contact pH" means the pH of a carbon char measured by contacting the char with an aqueous solution of a salt of a strong acid and a strong base, and then measuring the pH of the fluid in contact with the carbon after a period of time sufficient to establish a relatively stable pH reading. Prior to measurement of the normalized contact pH, however, the char is prepared first by oven-drying it and then contacting the dried char with an aqueous solution of a strong, non-oxidizing mineral acid, preferably a volatile mineral acid such as hydrochloric acid, to remove interferents which may mask or compromise the intrinsic ability of the char surface to remove metals from aqueous solution. Following this procedure, the char is rinsed with deionized water to remove any free acid from the surface, and then oven-dried to remove any residual water from the char. The char resulting from this procedure is then allowed to contact, with stirring, the aqueous solution of a salt of a strong acid and a strong base as described above.

Various ratios of char weight to solution volume and concentration may be chosen to measure the normalized contact pH of the carbon char/solution mixture, but the choice will affect the final value of the measured normalized contact pH since pH is a concentration-dependent parameter. However, the parameters which give rise to the observed pH are intrinsic properties of the carbon surface which have a direct bearing upon the metals-removal capabilities of the char. It is not necessary to know the precise nature of these surface properties, i.e. which features of the carbon surface are responsible for the observed metals removal. However, it is necessary to normalize these surface features such that meaningful comparisons can be made of the metals-removal capabilities among different carbon materials. Since hydrogen ion is likely to be the most readily displaced of all cations, and since a large excess of hydrogen ion can remove other cations which may compromise the maximum intrinsic metals-removal ability of the char, prior exposure of a char to hydrogen ion can be used to provide a common, or "normalized" basis for the comparison of the metals-removal abilities of one char to another provided any free acid is removed from the char after said exposure.

BRIEF DESCRIPTION OF THE DRAWINGS

FIG. 3 shows graphically the relationship between lead removal and the non-normalized contact pH of carbon chars A,B,C,D, and E after treatment with calcium chloride solution and is compared to that of the normalized chars given in FIG. 1 and to the calcium chloride-treated chars after re-normalization.

PRESENTLY PREFERRED EMBODIMENTS

The following examples illustrate preferred embodiments of the present invention.

Figure 1:
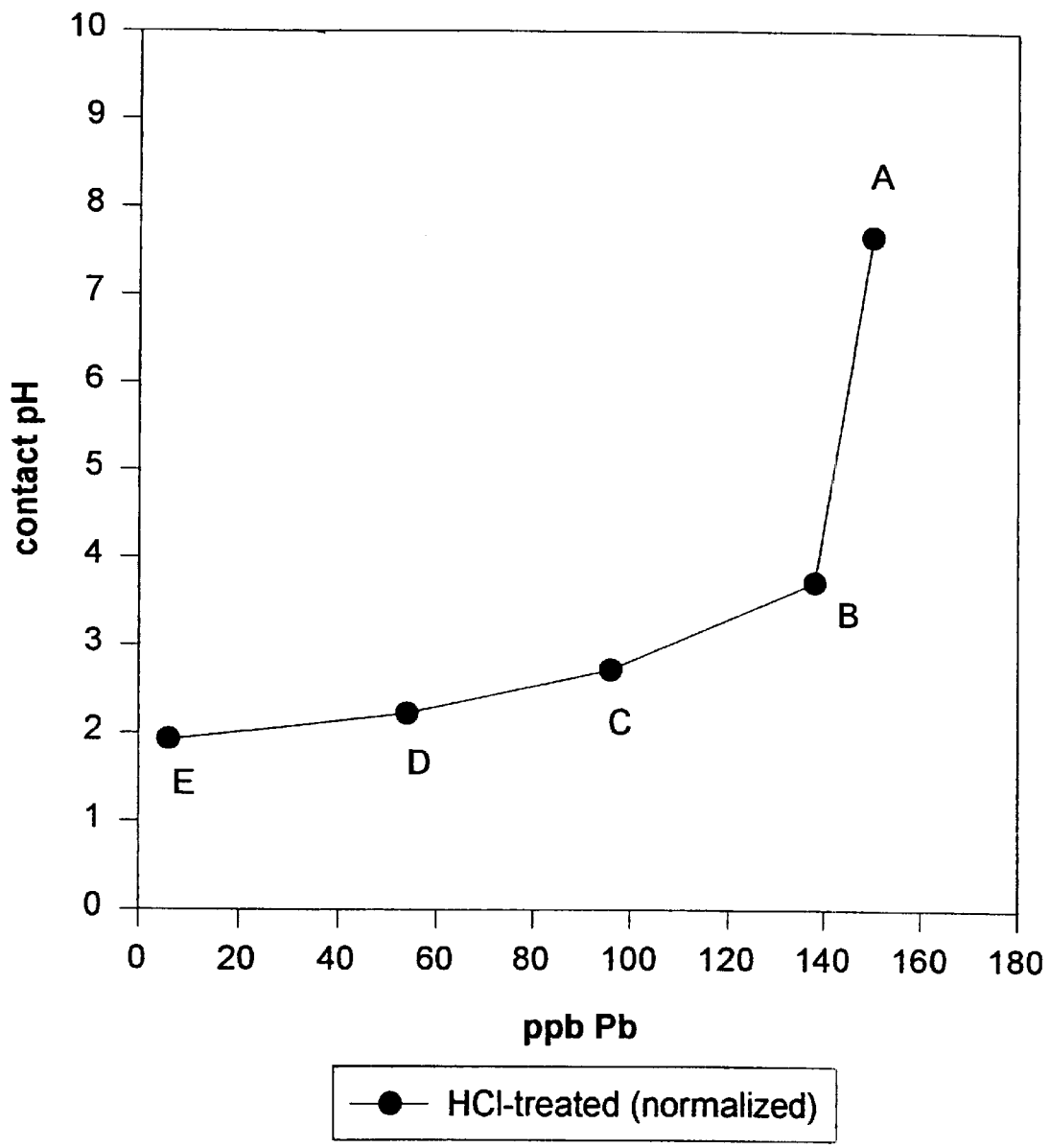
FIG. 1 shows graphically the relationship between lead removal and the normalized contact pH of carbon chars A, B, C, D and E.

In Example 1 the normalized contact pH values of five carbonaceous chars, identified as A, B, C, D and E, are measured and compared for their ability to remove lead from an aqueous solution. As shown in FIG. 1, the measured lead residuals decrease (lead removal improves) with decreasing values of the normalized contact pH. Although a large decrease in pH corresponds initially to only a small increase in lead removal capability, below a normalized contact pH of about 2.5 even a small decrease in pH corresponds to a surprisingly large increase in lead removal ability.

Figure 2:
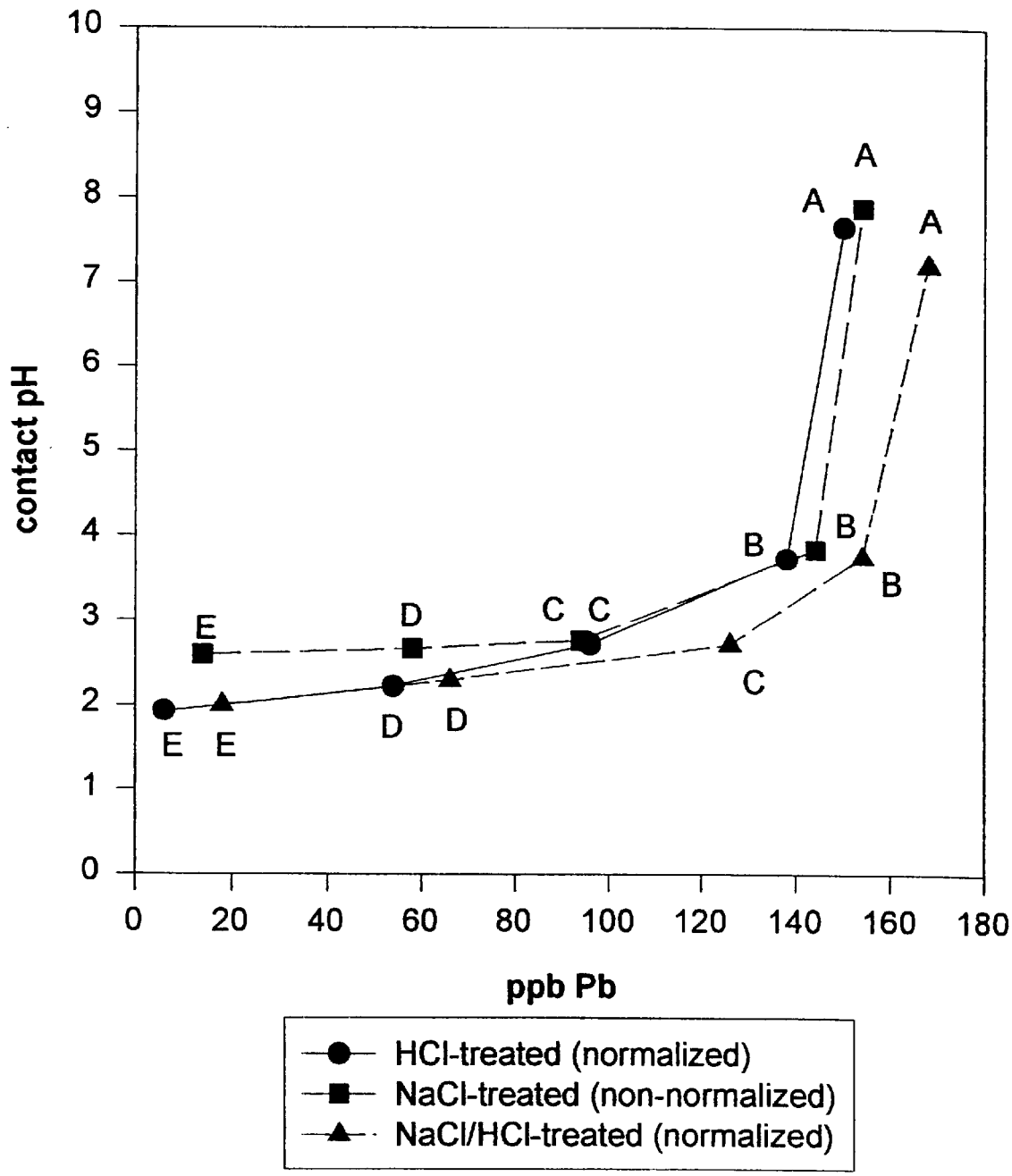
FIG. 2 shows graphically the relationship between lead removal and the non-normalized contact pH of carbon chars A,B,C,D, and E after treatment with sodium chloride solution and is compared to that of the normalized chars given in FIG. 1 and to the sodium chloride-treated chars after re-normalization.

In Example 2, it is shown that both the contact pH and the lead removal capabilities of the carbon chars prepared in Example 1 can be compromised by prior exposure of the chars to sodium chloride solution. As shown in FIG. 2, the contact pH is raised for those carbons which had normalized contact pH values initially below a pH of 2.5, while the lead removal capabilities of the carbons are marginally degraded.

In Example 3, it is shown that the chars which have been compromised by their exposure to sodium chloride solution can be normalized once again with respect to both contact pH and lead removal capability in accordance with the present invention. The agreement is particularly striking at normalized contact pH values below about 2.5.

In Example 4, it is shown that both the contact pH and the lead removal capabilities of the carbon chars prepared in Example 1 can be compromised by prior exposure of the chars to calcium chloride solution. As shown in FIG. 3, the contact pH is raised substantially for those carbons which had normalized contact pH values initially below a pH of 2.5, while the lead removal capabilities of the carbons are again marginally. degraded.

In Example 5, it is shown that the chars which have been compromised by their exposure to calcium chloride solution can be normalized once again with respect to both contact pH and lead removal capability in accordance with the present invention. The agreement is particularly striking at normalized contact pH values below about 2.5

EXAMPLE 1

Five carbonaceous chars were prepared in the following manner:

Five equivalent fifty-gram portions were taken from a common lot of 12×40 mesh F200 carbon (Calgon Carbon Corporation, Pittsburgh, Pa.). One of the five, fifty-gram, portions of F200 carbon was dried in an oven at approximately 150° C. for at least 16 hours and used without further preparation or treatment. This char was labeled char "A".

One of the remaining four, fifty-gram, portions of F200 carbon was treated as follows: 50 grams of sodium persulfate ($Na_2S_2O_8$) was dissolved in 1 N sulfuric acid solution and then diluted to 1 liter with 1 N sulfuric acid solution. This solution was placed into a four-liter beaker together with a one-inch Teflon-covered stirring bar and a thermometer capable of measuring temperatures up to 150° C. The beaker was then placed into a 100 mm×190 mm diameter PYREX crystallizing dish, and the crystallizing dish was placed on a stirrer/hotplate. After adding approximately 0.5 liter of water to the crystallizing dish, the hotplate/stirrer was activated. After heating, with stirring, the sodium persulfate/sulfuric acid solution to about 60° C., the fifty-gram portion of F200 carbon was added to the stirred solution. The temperature of the stirring carbon/solution mixture was then maintained at between about 70° C. and 80° C. for 2 hours. After cooling to ambient temperature and standing overnight, the solution was separated from the carbon, and the carbon was placed into an approximately 5-cm diameter glass column and rinsed upflow with deionized water at approximately 1 bed-volume per minute or greater for at least 16 hours. After water-rinsing, the carbon was dried in an oven at approximately 150° C. for at least 16 hours. The char resulting from this treatment was labeled char "B".

One of the remaining three fifty-gram, portions of F200 carbon was treated as described above for char "B" except that the amount of sodium persulfate used was increased to 125 grams. The char resulting from this treatment was labeled char "C".

One of the remaining two, fifty-gram, portions of F200 carbon was treated as described above for char "B" except that the amount of sodium persulfate used was increased to 275 grams. The char resulting from this treatment was labeled char "D".

The remaining fifty-gram portion of F200 carbon was treated as described above for char "B" except that the amount of sodium persulfate used was increased to 400 grams. The char resulting from this treatment was labeled char "E".

Measuring Normalized Contact pH

Seven-gram representative samples of the five granular carbonaceous chars prepared as described above, and labeled A,B,C, D and E, were placed, respectively, into five one-liter Erlenmeyer flasks together with a one-inch Teflon-covered stirring bar. 700 ml portions of 1 M HCL solution were then added to each flask. The flasks were tightly stoppered and stirred at 400 RPM on an electronic stirplate for at least 48 hours. At the end of this time period, the acid solution was separated from the chars and the chars were rinsed with deionized water until the pH of the spent effluent rinse water was within about 1 pH unit of the fresh inlet rinse water. After water-rinsing, the chars were oven-dried in air at 110–150° C. for at least 18 hours. After oven-drying, a 5.0 gram portion of each char was taken to measure the normalized contact pH as follows:

5.0 grams of char, 20.0 mL of an 0.5 M aqueous sodium sulfate solution, and a small Teflon-covered stirring bar. were placed into a 50 mL beaker. After stirring the char/solution mixture for at least 30 minutes under ambient conditions, the pH of the solution in contact with the char was measured. This pH was the normalized contact pH of the char.

Measuring Metals Removal

A separate portion was also taken from the remainder of each HCl-treated, water-rinsed, and oven-dried char to measure the lead removal capability of the char in the following manner:

After pulverizing the char sample, a 2.5 mg sample of the char was added to a polyethylene bottle containing 1.0 liter of an aqueous lead nitrate solution prepared by dissolving 0.0029 grams of $Pb(NO_3)_2$ in 12 liters of distilled, deionized water to produce a solution which has a lead concentration of approximately 150 ppb. A Teflon-covered stirring bar was then added to the bottle and, after tightly capping the bottle, the contents were stirred overnight under ambient conditions at 400 RPM on an electronic stirplate. At the end of this time period, the contents of the bottle were filtered to separate the carbon from the lead solution, and the filtrate was analyzed for residual lead content by a Palintest (Palintest SA-1000 Scanning Analyzer, Test Kit No. PT420, Palintest/USA, Erlanger, Ky.)

The measured values of the normalized contact pH were then plotted, respectively, against the measured values of the residual lead content for each carbon char, as given in FIG. 1.

EXAMPLE 2

Separate 8.0 gram portions of the five granular chars used in Example 1 were placed, respectively, into five one-liter Erlenmeyer flasks together with a one-inch Teflon-covered stirring bar. 800 mL portions of 1 M NaCl solution were then added to each flask. The flasks were tightly stoppered and stirred at 400 RPM on an electronic stirplate for at least 48 hours under ambient conditions. At the end of this time period, the NaCl solution was separated from the chars and the chars were rinsed thoroughly with deionized water. After water-rinsing, the chars were oven-dried in air at 110–150° C. for at least 18 hours. After oven-drying, a 5.0 gram portion of each char was taken to measure the non-normalized contact pH as follows:

5.0 grams of char, 20.0 mL of an 0.5 M aqueous sodium sulfate solution, and a small Teflon-covered stirring bar were placed into a 50 mL beaker. After stirring the char/solution mixture for at least 30 minutes under ambient conditions, the pH of the solution in contact with the char.was measured. This pH was the non-normalized contact pH of the char.

A separate portion was also taken from the remainder of each NaCl-treated, water-rinsed, and oven-dried char to measure the lead removal capability of the char by the same procedure described in Example 1.

The measured values of the non-normalized contact pH were then plotted, respectively, against the measured values of the residual lead content for each carbon char, as given in FIG. 2.

EXAMPLE 3

The non-normalized chars treated with sodium chloride solution in Example 2 were re-normalized in the following manner:

The chars used to measure. the non-normalized contact pH in Example 2 were separated from the sodium sulfate solution, rinsed thoroughly with deionized water, and transferred to one-liter Erlenmeyer flasks, together with, respectively, any char not used for measurement of either the non-normalized contact pH or lead removal capability. After adding a one-inch Teflon-covered stirring bar to each flask and 100 mL of 1 M HCl for each gram of carbon in a given flask, the flasks were tightly stoppered and the HCl solution was allowed to contact the char, with stirring at 400 RPM on an electronic stirplate, for at least 48 hours under ambient conditions. At the end of this time period, the HCl solution was separated from the chars and the chars were rinsed thoroughly with deionized water until the pH of the spent effluent water was within about 1 pH unit of the fresh inlet rinse water. After water-rinsing, the chars were oven-dried in air at 110–150° C. for at least 18 hours. After oven-drying, a 5.0 gram portion of each char was taken to measure the normalized contact pH by the procedure described in Example 1.

A separate portion was also taken from the remainder of each HCl-treated, water-rinsed, and oven-dried char to measure the lead removal capability of the char by the procedure described in Example 1.

The measured values of the re-normalized contact pH for each sodium chloride-treated carbon char were then plotted, respectively, against the measured values of the residual lead content for each carbon char, as given in FIG. 2

EXAMPLE 4

Separate 8.0 gram portions of the five granular chars used in Example 1 were placed, respectively, into five one-liter Erlenmeyer flasks together with a one-inch Teflon-covered stirring bar. 800 mL portions of 1 M $CaCl_2$ solution were then added to each flask. The flasks were tightly stoppered and stirred at 400 RPM on an electronic stirplate for at least 48 hours under ambient conditions. At the end of this time period, the $CaCl_2$ solution was separated from the chars and the chars were rinsed thoroughly with deionized water. After water-rinsing, the chars were oven-dried in air at 110–150° C. for at least 18 hours. After oven-drying, a 5.0 gram portion of each char was taken to measure the non-normalized contact pH by the procedure described in Example 2.

A separate portion was also taken from the remainder of each $CaCl_2$-treated, water-rinsed, and oven-dried char to measure the lead removal capability of the char by the procedure described in Example 1.

The measured values of the non-normalized contact pH were then plotted, respectively, against the measured values of the residual lead content for each carbon char, as given in FIG. 3.

EXAMPLE 5

The chars remaining from measurement of the non-normalized contact pH in Example 4 were filtered, rinsed thoroughly with deionized water, and transferred to one-liter Erlenmeyer flasks, together with any char not used for measurement of either the non-normalized contact pH or lead removal capability. After adding a one-inch Teflon-covered stirring bar to each flask and 100 mL of 1 M HCl for each gram of carbon in a given flask, the flasks were tightly stoppered and the HCl solution was allowed to contact the char, with stirring at 400 RPM on an electronic stirplate, for at least 48 hours under ambient conditions. At the end of this time period, the HCl solution was separated from the chars and the chars were rinsed thoroughly with deionized water until the pH of the spent effluent water was within about 1 pH unit of the fresh inlet rinse water. After water-rinsing, the chars were oven-dried in air at 110–150° C. for at least 18 hours. After oven-drying, a 5.0 gram portion of each char was taken to measure the normalized contact pH by the procedure described in Example 1.

A separate portion was also taken from the remainder of each HCl-treated, water-rinsed, and oven-dried char to measure the lead removal capability of the char by the procedure described in Example 1.

The measured values of the normalized contact pH were then plotted, respectively, against the measured values of the residual lead content for each carbon, as given in FIG. 3.

While the presently preferred embodiments of the invention have been described in particularity, the invention may be otherwise embodied within the scope of the appended claims:

1. A metal removing carbonaceous char for the removal of cationic forms of group IA, IIA, IIIA, IVA, VA, IB, IIB, IIIB, IVB, VB, VIIB, and group VIII metals from aqueous or non-organic media, said char being characterized by having a normalized contact pH less than about 2.5 wherein said normalized contact pH is measured by:

(1) stirring under ambient conditions a slurry of about 1.0 gram of said char per 100 milliliters of a 1 molar aqueous solution of hydrochloric acid;

(2) separating the acid solution from the acid-treated char;

(3) rinsing the acid-treated char with deionized water until the pH of the spent deionized water is within at most 1 pH-unit of the deionized water prior to rinsing;

(4) drying the rinsed, acid-treated char at 110–150° C.; and (5) stirring about 0.25 grams of the dried, rinsed, acid-treated char per milliliter of a 0.5 molar sodium sulfate solution and measuring thereafter the pH of the solution in contact with said dried, rinsed, acid-treated char, said pH being the normalized contact pH of said char for removing said cationic forms of said metals.

2. The carbonaceous char of claim 1 wherein said char used for removal of said metals is prepared by contacting a carbonaceous char with an inorganic persulfate.

3. The carbonaceous char of claim 1 wherein said char used for removal of said metals is one of granular, pelleted, shaped, powdered, fiber, cloth, or formed monolith.

* * * * *